(12) United States Patent
Falk et al.

(10) Patent No.: US 11,485,024 B2
(45) Date of Patent: Nov. 1, 2022

(54) DETERMINATION OF OBJECT POSITION BY ALIGNED DEVICE PLACEMENT

(71) Applicant: Sony Mobile Communications Inc., Tokyo (JP)

(72) Inventors: Mattias Falk, Lund (SE); Hannes Bergkvist, Helsingborg (SE); Ivar Bergkvist, Lund (SE); Emil Hansson, Lund (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 818 days.

(21) Appl. No.: 16/461,722

(22) PCT Filed: Nov. 30, 2016

(86) PCT No.: PCT/EP2016/079260
§ 371 (c)(1),
(2) Date: May 16, 2019

(87) PCT Pub. No.: WO2018/099550
PCT Pub. Date: Jun. 7, 2018

(65) Prior Publication Data
US 2019/0358826 A1    Nov. 28, 2019

(51) Int. Cl.
*B25J 13/08* (2006.01)
*G01S 1/04* (2006.01)
(Continued)

(52) U.S. Cl.
CPC .............. *B25J 13/089* (2013.01); *G01S 1/042* (2013.01); *G01S 5/0247* (2013.01); *G01S 5/14* (2013.01); *G01S 5/30* (2013.01); *G06K 19/07749* (2013.01)

(58) Field of Classification Search
CPC ........... B25J 13/089; G06K 2017/0045; G06K 19/041; G06K 19/07749; G06K 19/04;
(Continued)

(56) References Cited

U.S. PATENT DOCUMENTS

2005/0174235 A1 *  8/2005  Davis ................. G08B 21/0269
                                                        340/8.1
2007/0182632 A1     8/2007  Ash
(Continued)

FOREIGN PATENT DOCUMENTS

DE       19837550 A1 *  2/1999
WO     2014012628 A1     1/2014

OTHER PUBLICATIONS

International Search Report and Written Opinion from counterpart International Patent Application No. PCT/EP2016/079260 dated Oct. 2, 2017; 9 pages.

*Primary Examiner* — Bernarr E Gregory
*Assistant Examiner* — Fred H Mull
(74) *Attorney, Agent, or Firm* — Tucker Ellis LLP (57) ABSTRACT

A device (10) is placed on an object (30). A reference feature of the object (30) is aligned with a reference feature of the device (10). Based on signals transmitted between at least one measurement point of the device (10) and a further device (20), a position of the at least one measurement point is measured. The position of the object (30) is then determined based on the measured position of the at least one measurement point and based on information on arrangement of the at least one measurement point in relation to the reference feature of the device (10).

23 Claims, 5 Drawing Sheets

(51) Int. Cl.
*G01S 5/02* (2010.01)
*G01S 5/14* (2006.01)
*G01S 5/30* (2006.01)
*G06K 19/077* (2006.01)

(58) Field of Classification Search
CPC .......... G01S 1/042; G01S 5/0247; G01S 5/14; G01S 5/30
See application file for complete search history.

(56) References Cited

U.S. PATENT DOCUMENTS

| | | | |
|---|---|---|---|
| 2007/0273483 A1* | 11/2007 | Koch | G06K 19/07749 340/10.3 |
| 2007/0290941 A1* | 12/2007 | Brown | G06K 19/07749 343/851 |
| 2010/0141506 A1 | 6/2010 | Gulden | |
| 2010/0148963 A1* | 6/2010 | O'Hern | G01S 5/0063 340/572.1 |
| 2010/0328073 A1* | 12/2010 | Nikitin | G06K 7/0008 340/572.1 |
| 2011/0210167 A1* | 9/2011 | Lyon | G06F 13/4095 398/115 |
| 2013/0181839 A1* | 7/2013 | Cao | G08B 13/08 340/572.1 |

* cited by examiner

DETERMINATION OF OBJECT POSITION BY ALIGNED DEVICE PLACEMENT

FIELD OF THE INVENTION

The present invention relates to methods for determining the position and/or orientation of an object and to corresponding devices and systems.

BACKGROUND OF THE INVENTION

In various fields, it is desirable to determine a position and/or orientation of an object in three-dimensional space. One example is the field of robotics, where a robot may need to perform operations in relation to such object, e.g., picking up the object. In this case, the position and orientation of the object may need to be determined within a coordinate system used by the robot for controlling its operations. Other applications may involve indoor or outdoor tracking of objects.

However, determining the position or orientation of an object may be a complex task. For example, determining the position of the object with the aid of computer vision systems may require utilization of sophisticated image processing techniques. Further, computer vision systems are typically dependent on lighting, line-of-sight conditions, or the like.

Accordingly, there is a need for technologies which overcome the above-mentioned problems and allow for efficiently determining the position of an object.

SUMMARY OF THE INVENTION

According to an embodiment, a method of determining a position of an object is provided. According to the method, a device is placed on the object. For example, the device could be attached by magnetic force to the object. Further, the device could be fixed by a non-permanent adhesive to the object. A reference feature of the object is aligned with a reference feature of the device. In this way, it can be achieved that the device is placed in a well-defined position and/or with a well-defined orientation on the object. Based on signals transmitted between at least one measurement point of the device and a further device, a position of the at least one measurement point is measured. These measurements may for example involve run-time based distance measurements, and/or trilateration or triangulation calculations for each measurement point. The position of the object is then determined based on the measured position of the at least one measurement point and based on information on arrangement of the at least one measurement point in relation to the reference feature of the device. Here, the information on arrangement of the at least one measurement point in relation to the reference feature of the device allows for considering how the measurement point is positioned in relation to the reference feature of the object, so that the position of the object and optionally also orientation of the object can be determined in a precise manner.

According to an embodiment, the device has multiple measurement points, and the positions of these multiple measurement points are measured based on signals transmitted between the multiple measurement points and the further device. The position of the object and an orientation of the object is then determined based on the measured positions of the measurement points and based on information on arrangement of the measurement points in relation to the reference feature of the device. For example, three measurement points on the device may be used to determine the position and orientation of the object in three-dimensional space, e.g., in terms of three position coordinates and three rotation angles.

In addition or as an alternative to using multiple measurement points for determining the orientation, an orientation of the object may be determined based on measurements by an orientation sensor of the device and based on information on arrangement of the orientation sensor in relation to the reference feature of the device. The orientation sensor could for example be based on one or more accelerometers and/or gyroscopic sensors. If the measurements are not evaluated by the device itself, but rather by some other device, such as the further device, the device may send one or more reports of the measurements by the orientation sensor to the other device. Utilization of the orientation sensor may allow for implementing the device with less measurement points and thus for obtaining a smaller design of the device.

According to an embodiment, a system is provided. The system comprises a device to be placed on an object. This device comprises a reference feature configured to be aligned with a reference feature of the object. Further, the device comprises at least one measurement point. The system also comprises a further device configured to receive signals from the at least one measurement point of the device and/or to send signals to the at least one measurement point of the device. Further, the system comprises at least one processor. The at least one processor is configured to measure a position of the at least one measurement point based on signals transmitted between the at least one measurement point and the further device. Further, the at least one processor is configured to determine a position of the object based on the measured position of the at least one measurement point and based on information on arrangement of the at least one measurement point in relation to the reference feature of the device.

The at least one processor may be part of the further device. This option may be beneficial if the signals are transmitted from the device to the further device. However, the at least one processor could also be part of the device, which could be useful if the signals are transmitted from the further device to the device. In some scenarios, the above-mentioned functionalities could also be implemented by multiple processors which are distributed to the device and the further device.

According to an embodiment, the device comprises multiple measurement points. The at least one processor may then be configured to measure positions of the multiple measurement points based on signals transmitted between the multiple measurement points and the further device and to determine the position of the object and an orientation of the object based on the measured positions of the measurement points and based on information on arrangement of the measurement points in relation to the reference feature of the device.

According to an embodiment, the device comprises an orientation sensor, and the at least one processor is configured to determine an orientation of the object based on measurements by the orientation sensor and based on information on arrangement of the orientation sensor in relation to the reference feature of the device.

Accordingly, the at least one processor may be configured to perform the steps of a method according to any one of the above embodiments.

According to an embodiment, a device is provided. The device comprises a reference feature configured to be aligned with a reference feature of an object on which the device is placed. Further, the device comprises at least one measurement point having a known arrangement in relation to the at least one reference feature of the device and configured to send signals to a further device and/or to receive signals from a further device. The signals are configured to enable measurement of a position of the at least one measurement point.

According to an embodiment, the device comprises multiple measurement points. Each measurement point has a known arrangement in relation to the at least one reference feature of the device and is configured to send signals to a further device and/or to receive signals from a further device.

According to an embodiment, the device comprises an orientation sensor having a known arrangement in relation to the at least one reference feature of the device. The orientation sensor could for example be based on one or more accelerometers and/or gyroscopic sensors.

According to an embodiment, the device may also comprise at least one processor configured to measure a position of the at least one measurement point based on signals transmitted between the at least one measurement point and the further device. Further, the at least one processor may be configured to determine a position of the object based on the measured position of the at least one measurement point and based on information on arrangement of the at least one measurement point in relation to the reference feature of the device.

In the above mentioned embodiments of a method, system, or device, the reference feature of the device may comprise a triangular shaped corner formed by a first outer edge and a second outer edge of the device. The corner may have an angle of 90 degree. This kind of reference feature of the device allows for intuitive and precise alignment with various kinds of reference features present on the object. For example, because many typical objects have rectangular shapes or are at least provided with parts having rectangular shape, outer corners of the object may be efficiently used as the reference feature of the object. Orientation alignment may then be achieved by aligning the two edges of the device with edges of the object, while position alignment may be achieved by aligning the tip of the corner with the outer corner of the object. Moreover, the triangular shaped corner of the device may also be precisely and intuitively aligned with various kinds of markers provided on an outer surface of the object, such as cross-shaped markers. However, it is noted that depending on the type of object for which the position and/or orientation is to be determined also various other types of reference feature of the object and matching reference feature of the device could be used.

In the above mentioned embodiments of a method, system, or device, the signals may comprise signals emitted from the at least one measurement point. The device may thus act as a beacon transmitting signals enabling the measurement of the position of the at least one measurement point. The at least one measurement point may then comprise a transmitter for sending the signals. In this case, no sophisticated signal processing may be needed in the device, and the device may thus be implemented in a compact manner and/or with low-complexity. In addition or as an alternative, the signals may comprise signals transmitted to the at least one measurement point. The at least one measurement point may then comprise a receiver for receiving the signals. In this case, the device may act as a receiver for positioning signals, which may for example enable direct determination of the position of the object by the device itself.

According to an embodiment, the signals comprise at least one of ultrasonic signals, radio signals, and radar signals. These signals may enable precise measurement of positions, without requiring line-of-sight conditions or favorable light conditions.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplaty embodiments described hereinafter.

The illustrated embodiments relate to scenarios where position and orientation of an object are determined to be used for controlling operation of a robot, e.g., an industrial robot to be used for manufacturing, packaging, or otherwise processing of a product. For example, the object could be a box, and the robot could be operable to pick up a part and put it into the box and/or to pick up a part from the box. However, it is noted that the illustrated way of determining position and orientation of an object could also be applied in various other applications, such as indoor or outdoor tracking of an object or virtual reality applications.

Figure 1:
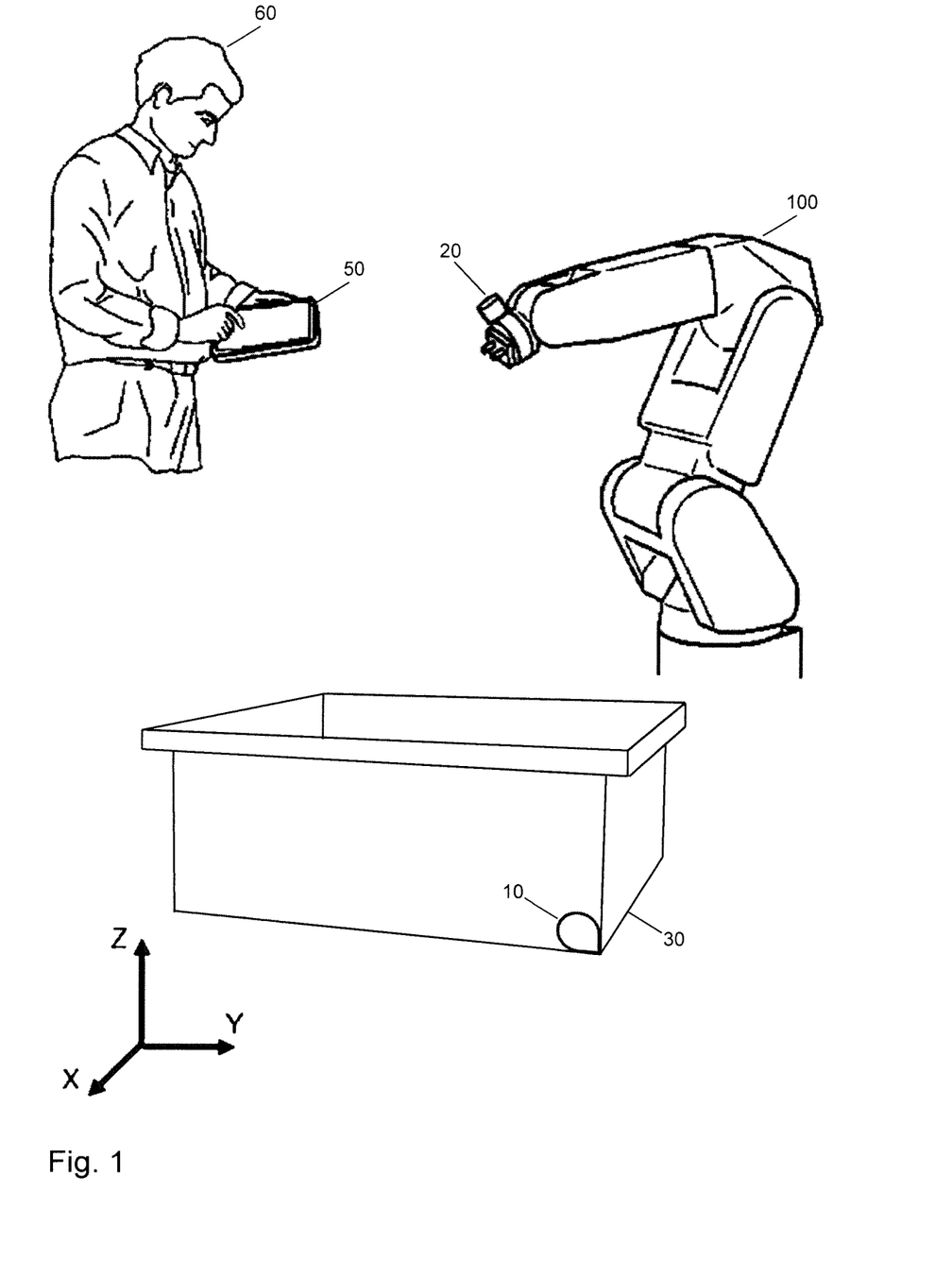
FIG. 1 schematically illustrates a system according to an embodiment of the invention.

FIG. 1 shows an exemplary scenario involving an industrial serial robot 100 including a receiver unit 20 mounted on a robotic arm of the robot 100. In the example of FIG. 1, it is assumed that the robot 100 is used for picking up parts from a box 30 and/or for putting parts into the box 30. Accordingly, the robot 100 needs to be configured with data defining the position and orientation of the box 30. Typically, the robot 100 would also be configured with data defining the geometry of the box 30, e.g., in terms of width, depth, height, or shape.

As illustrated, a beacon 10 is attached to the box 30. For attaching the beacon 10 to the box 30, the beacon 10 may for example be provided with a non-permanent magnet. Alternatively or in addition, the beacon 10 could be provided with a non-permanent adhesive or a suction cup. The beacon 10 is placed in a well-defined position and orientation on the box 30. This is achieved by bringing a reference feature of the beacon 10 into alignment with a reference feature of the box 30. Details of this alignment will be further explained below.

Further, FIG. 1 shows a controller 50 which may be used for controlling operation of the robot 100, beacon 10, and receiver unit 20. As illustrated, the controller 50 may be a handheld computer device, such as a tablet computer or smartphone. However, other types of controllers may be used as well, e.g., a stationary control terminal. Using the controller 50, an operator 60 may instruct the system measure signals transmitted from multiple measurement points of the beacon 10 to the receiver unit 20. This may for example be accomplished through an application executed by the controller 50, i.e., through software installed on the controller 50. Each of these measurement points defines a corresponding position in the coordinate system (x, y, z) of the robot 100. Form information concerning the arrangement of the measurement points on the beacon 10 and in relation to the reference feature of the beacon 10, the receiver unit 20 and/or controller 50 may then calculate the position and orientation of the reference feature of the beacon 10, which due to the alignment also enables determination of the position and orientation of the reference feature of the box 30 in the coordinate system of the robot 100. The latter position and orientation of the box 30 may then be used for controlling operation, in particular movement, of the robot 100.

Figure 2:
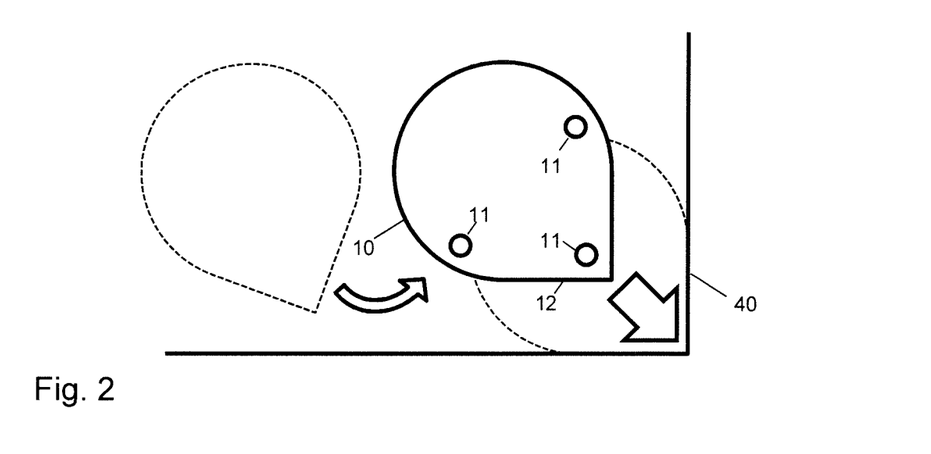
FIG. 2 schematically illustrates placement of a beacon on an object, using alignment of reference features according to an embodiment of the invention.

FIG. 2 further illustrates the placement and alignment of the beacon 10 on the box 30. As can be seen, in this example the reference feature of the beacon 10 is a triangular shaped corner 12 formed by two linear outer edges of the beacon 10. The corner has an angle of 90 degree, i.e., the edges forming the corner 12 are perpendicular to each other. Otherwise, the beacon 10 is disc-shaped. The reference feature on the box 30 is an outer corner 40 of the box 30. The beacon 10 is placed in such a way that the triangular shaped corner 12 points into the outer corner 40 of the box 30 and the edges of the corner are aligned with edges of the box 30. This may involve that the operator 60 rotates and shifts the beacon 10 on an outer surface of the box 30, until the corner 12 of the beacon 10 matches with the outer corner 40 of the box 30. The alignment can be visually confirmed by the operator 60. Further, the operator 60 may use the outer edges of the beacon 10 and the tip of the corner as a mechanical positioning aid. Accordingly, the beacon 10 can be easily placed and aligned in the desired position and orientation on the box 30.

As will be further explained in the following, the beacon 10, which is aligned in the desired position and orientation, may then be used for determining the position and orientation of the box 30 in the coordinate system of the robot 100.

As further illustrated in FIG. 2, the beacon 10 includes multiple measurement points 11. From each of these measurement points 11, the beacon 10 transmits a signal, which is received by the receiver unit 20. On the basis of the received signals, the receiver unit 20 and/or the controller 50 determines the position of each measurement point 11 in the coordinate system of the robot 100, e.g., using run-time based distance measurements, triangulation calculations, and/or trilateration calculations for each of the measurement points 11. Here, it is noted that for each of the measurement points 11, multiple measurements may need to be performed in order to measure the position of the measurement point 11. According to one option, which is further explained below, the multiple measurements are performed with the receiver unit 20 being placed in different positions (by movement of the robot 100). This has the benefit of enabling high accuracy without requiring excessive size of the receiver unit 20. Alternatively or in addition, the receiver unit 20 may include multiple receivers and/or multiple antennas so as to enable triangulation and/or trilateration already for a single position of the receiver unit 20.

Based on the known arrangement of the measurement points 11 in relation to the corner 12 and based on the assumption that the corner 12 is aligned with the corner 40, the receiver unit 20 and/or the controller 50 then determines the position and orientation of the corner 40 in the coordinate system of the robot 100. The receiver unit 20 and/or the controller 50 may for example store a management data set which defines the arrangement of the measurement points 11 in relation to the corner 12 or in relation to the corner 40, when it is aligned with the corner 12. This management data set may be preconfigure or may be selected by the operator 60. Further, this management data set could also be selected automatically depending on a signal or indicator transmitted by the beacon 10.

The position of the corner 40, i.e., the point where the two edges forming the corner 40 meet, may form an origin of a local coordinate system of the box 30, with axes of this local coordinate system of the box 30 being defined by the edges of the corner 40 and the direction perpendicular to these edges. Similarly, the position of the corner 12, i.e., the point where the two edges forming the corner 12 meet, may form an origin of a local coordinate system of the beacon 10, with axes of this local coordinate system of the beacon 10 being defined by the edges forming the corner 12 of the beacon 12 and the direction perpendicular to these edges. A rule for transformation between the coordinate system of the robot 100 and the local coordinate system of the box 30 and/or the local coordinate system of the beacon 10 may be determined on the basis of the measured positions of the measurement points 11 and the known arrangement of the measurement points 11 in relation to the corner 12. For example, the receiver unit 20 and/or the controller 50 could determine a transformation matrix implementing this transformation rule. The transformation rule may for example be used for moving the robot 100 to a certain position defined in the local coordinate system of the box 30, e.g., with the aim of picking up an object from this position or placing an object in this position. A rule for transformation between the local coordinate system of the beacon 10 and the local coordinate system of the box 30 may be determined on the basis of the known geometry defined by the alignment of the reference features. In some cases, the alignment of the reference features may also cause full alignment of the local coordinate system of the beacon 10 and the local coordinate system of the box 30. In other scenarios, the alignment of the reference features may indicate that the local coordinate system of the beacon 10 and the local coordinate system of the box 30 relate to each other by a known transformation, which may include a rotation and/or a translation.

It is noted that the scenario of FIGS. 1 and 2 is merely exemplary and that the illustrated concepts could be applied to various other scenarios where determination of the position and orientation of an object is needed. For example, the beacon 10 could be used for tracking and controlling the position and orientation of a work object in realtime, as it is processed by the robot 100. For this purpose, the beacon 10 may be attached to the work object. If the position or orientation of the work object varies, the corresponding position and orientation defined in the coordinate system of the robot 100 can be updated accordingly.

Further, it is noted that the illustrated number of measurement points 11 provided on the beacon 10 is merely exemplary. For example, a simplified version of the beacon 10 could provide only two measurement points 11, which could be used for calculating a two-dimensional orientation of the box 30 (e.g., an orientation within the x-y-plane). Further, if determination of the orientation is not needed, the beacon 10 could provide only one measurement point 11. Further, in addition or as an alternative to using multiple measurement points for determining the orientation, the beacon 10 could also include an orientation sensor, e.g., based on one or more accelerometers and/or gyroscopic sensors. In some scenarios, multiple beacons 10 may also be placed on multiple reference features of the box 30, e.g., to define different corners of the box 30.

Configuring and administrating metadata associated with the beacon 10, e.g., data representing the arrangement of the measurement points 11 in relation to the reference feature of the beacon 10, may be accomplished using a software application running on the controller 50. This software application may also guide the operator 60 with respect to the placement of the beacon 10 on the object. This may for example help to resolve ambiguities concerning the correct placement of the beacon 10 on the object. For example, the object could have multiple reference features which are each suitable for alignment of the beacon 10. In the example of FIGS. 1 and 2, the box 30 has multiple outer corners which are each in principle suitable for alignment of the beacon 10. Guidance for the operator 60 may then for example involve showing a graphical representation of the box 30 to the operator 60 and indicating the target position of the beacon 10 in this graphical representation. In other scenarios, the reference feature of the beacon 10 and the reference feature of the box 30 could be configured in such a way that there is only one possibility of achieving correct alignment of the reference feature of the beacon 10 and the reference feature of the box 30. For example, this could be achieved by providing the reference feature of the beacon 10 and the reference feature of the box with unique key structures matching each other.

As can be seen, the placement and alignment of the beacon 10 using matching reference features on the beacon 10 and the object allows for intuitive and precise determination of the position and orientation of the object.

Figure 3:
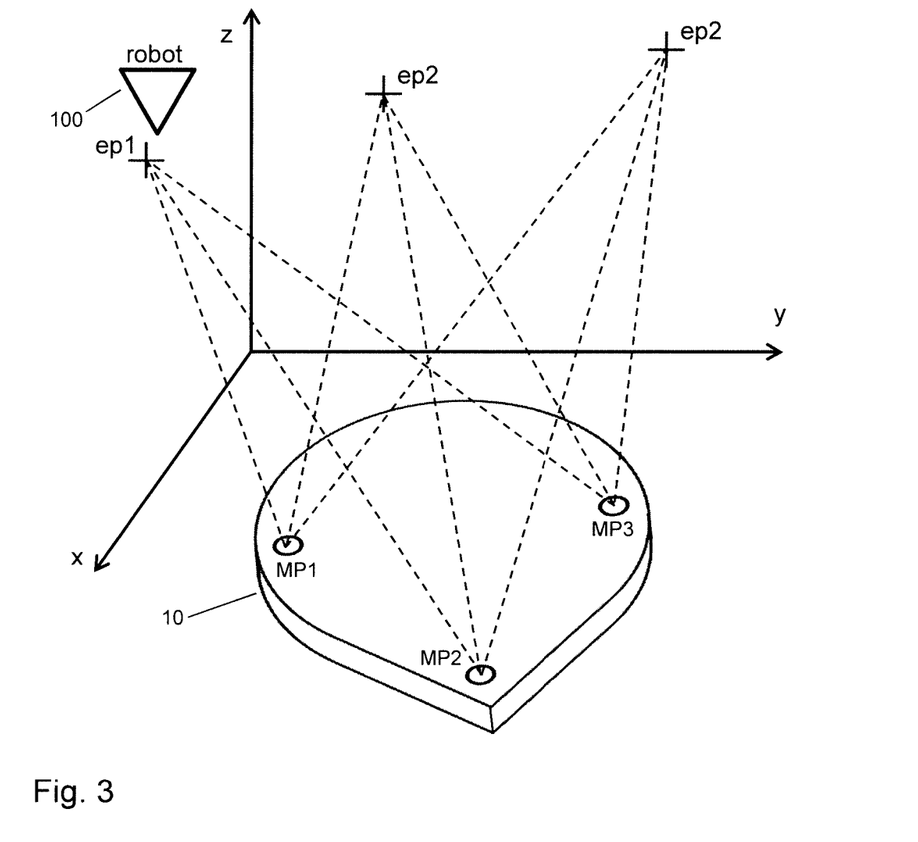
FIG. 3 schematically illustrates an exemplary scenario in which positions of multiple measurement points on the beacon are measured using multiple different positions of a receiver.
Figure 4:
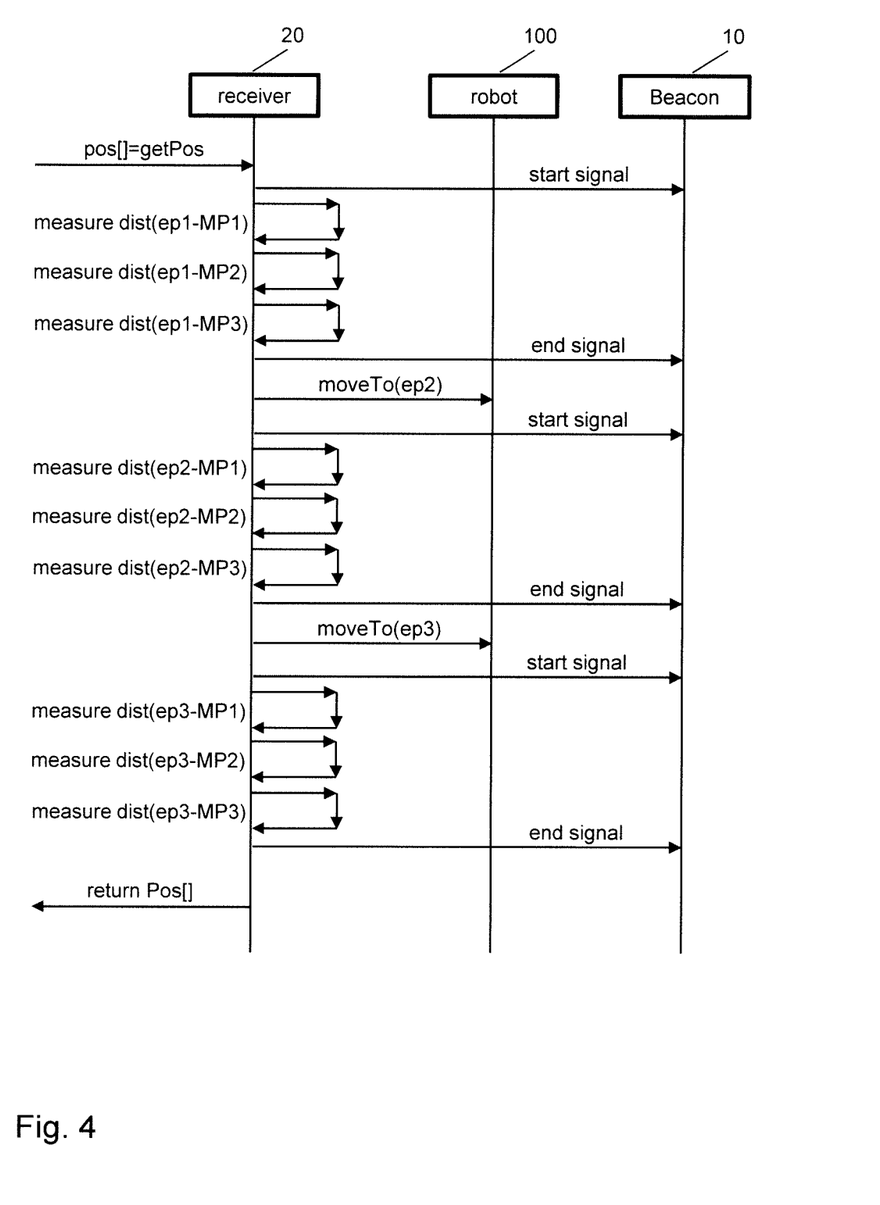
FIG. 4 schematically illustrates an example of processes performed in the scenario of FIG. 3.

FIGS. 3 and 4 show an example of how the positions of multiple measurement points of the beacon 10 can be efficiently measured with a single receiver in the receiver unit 20. As illustrated, this example assumed three measurement points on the beacon 10 (denoted MP1, MP2, and MP3). These measurement points are spaced apart from each other on an upper surface of the beacon 10. Further, FIG. 2 shows three different locations of placing the receiver unit 20 (denoted by ep1, ep2, and ep3). FIG. 4 shows exemplary processes which may be performed to measure the positions of the measurement points MP1, MP2, and MP3 in the coordinate system of the robot.

As illustrated by the processes of FIG. 4, an instruction to get the positions of the measurement points (denoted by "pos[ ]=getPos") is provided to the receiver unit 20. For example, this instruction may be sent by the controller 50. At this point, the receiver unit 20 is located at the location ep1. The measurement points MP1 then send their signal. The measurement points MP1, MP2, and MP3 may send their signals sequentially, according to a preconfigured order. This corresponds to time-division multiplexing of the signals of the different measurement points. However, other ways of multiplexing the signals of the different measurement points could be used as well, e.g., frequency division multiplexing and/or code division multiplexing. As illustrated, the sending of the signals may be controlled by the receiver unit 20 sending an instruction to start sending the signals (denoted by "start signal") to the beacon 10 and by the receiver unit 20 sending an instruction to stop sending the signals (denoted by "stop signal") to the beacon 10. The receiver unit 20 receives the signals from the different measurement points MP1, MP2, MP3 and calculates the distances between the receiver unit 20 and each of the measurement points MP1, MP2, MP3. This may be accomplished based on the strength of the received signal. Alternatively or in addition, the receiver unit 20 may also save a result of a measurement on the signal from each of the measurement points MP1, MP2, MP3 for later use.

The robot 100 then moves the receiver unit 20 to the location ep2. As illustrated, this may be accomplished by the receiver unit 20 sending a corresponding instruction (denoted by "moveTo(ep2)") to the robot 100. This instruction can be sent directly from the receiver 20 to the robot 100 or indirectly via the controller 50. For the location ep2, the above measurements on the signals from the measurement points MP1, MP2, MP3 are repeated. Accordingly, each of the measurement points MP1, MP2, MP3 again sends its signal. As illustrated, this may be controlled by the receiver unit 20 sending an instruction to start sending the signal (denoted by "start signal") to the beacon 10 and by the receiver unit 20 sending an instruction to stop sending the signal (denoted by "stop signal") to the beacon 10. The receiver unit 20 receives the signals from the different measurement points MP1, MP2, MP3 and calculates the distances between the receiver unit 20 and each of the measurement points MP1, MP2, MP3. This may be accomplished based on the strength of the received signal. Alternatively or in addition, the receiver unit 20 may also save a result of a measurement on the signal from each of the measurement points MP1, MP2, MP3 for later use.

The robot then moves the receiver unit 20 to the location ep3. As illustrated, this may be accomplished by the receiver unit 20 sending a corresponding instruction (denoted by "moveTo(ep3)") to the robot 100. This instruction can be sent directly from the receiver unit 20 to the robot 100 or indirectly via the controller 50. For the location ep3, the above measurements on the signals from the measurement points MP1, MP2, MP3 are repeated. Accordingly, each of the measurement points MP1, MP2, MP3 again sends its signal. As illustrated, this may be controlled by the receiver unit 20 sending an instruction to start sending the signal (denoted by "start signal") to the beacon 10 and by the receiver unit 20 sending an instruction to stop sending the signal (denoted by "stop signal") to the beacon 10. The receiver unit 20 receives the signals from the different measurement points MP1, MP2, MP3 and calculates the distances between the receiver unit 20 and each of the measurement points MP1, MP2, MP3. This may be accomplished based on the strength of the received signal. Alternatively or in addition, the receiver unit 20 may also save a result of a measurement on the signal from each of the measurement points MP1, MP2, MP3 for later use.

At this point, the receiver 20 has determined the distances between the receiver unit 20 and the measurement points MP1, MP2, MP3 for each of the three different locations of the receiver unit 20. Using these distances, the positions of the measurement points MP1, MP2, MP3 in the coordinate system of the robot 100 can be determined, e.g., by triangulation and/or trilateration based on the measurements for each measurement point MP1, MP2, MP3 at each position. For example, the position of the measurement point MP1 could be determined by trilateration on the basis of the distances between the measurement point MP1 and the receiver unit 20 as measured for the different positions ep1, ep2, and ep3. Similarly, the position of the measurement point MP2 could be determined by trilateration on the basis of the distances between the measurement point MP2 and the receiver unit 20 as measured for the different positions ep1, ep2, and ep3. Similarly, the position of the measurement point MP3 could be determined by trilateration on the basis of the distances between the measurement point MP3 and the receiver unit 20 as measured for the different positions ep1, ep2, and ep3.

The receiver unit 20 then provides the determined positions for further evaluation (denoted by "return Pos[ ]") either to the external controller 50 or to further internal processing within the receiver unit 20.

It is noted that while the above-mentioned examples refer to a scenario where a receiver is used for receiving signals from one or more measurement points on the beacon, it would also be possible to implement the illustrated concepts on the basis of signals transmitted in the opposite direction, by sending signals to a device which is placed and aligned with the aid of the reference features on the object and is equipped with receivers at one or more measurement points.

Figure 5:
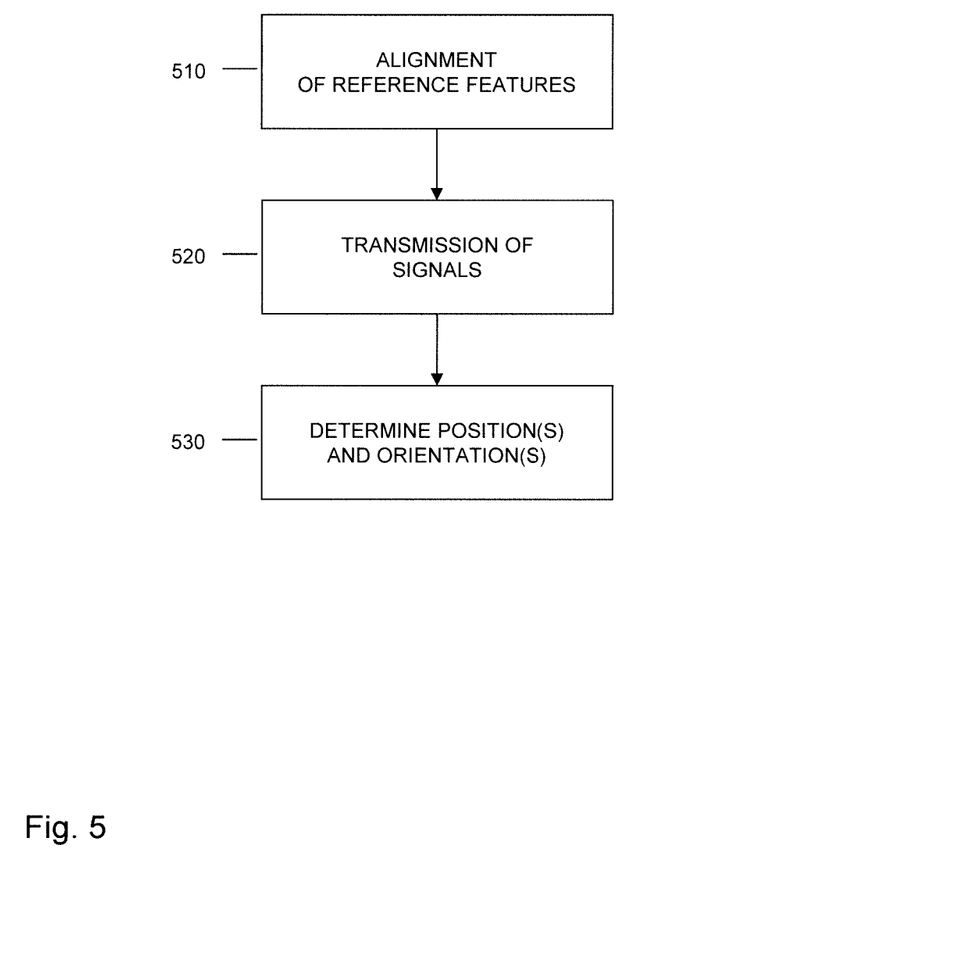
FIG. 5 shows a flowchart for illustrating a method according to an embodiment of the invention.

FIG. 5 shows a flowchart illustrating a method which may be used for determining a position and optionally also orientation of an object according to the concepts as described above, e.g., a position and optionally orientation of the box 30. The position and optionally orientation may for example be defined in a coordinate system of a robot, such as the above-mentioned robot 100. However, other applications are possible as well, e.g., tracking of the object in an indoor or outdoor environment or representation of the object in virtual reality environment. The method may for example be implemented by a device which receives signals for performing position measurements, such as the above-mentioned receiver unit 20, or a device which collects position measurements from one or more other devices, e.g., the above-mentioned controller 50. Further, the method may be implemented by a device which is placed on the object for the purpose of enabling determination of the position and optionally orientation of the object, such as the above-mentioned beacon 10. If a processor based implementation of the device is utilized, at least a part of the steps of the method may be performed, controlled, and/or guided by one or more processors of the device. In some scenarios, at least a part of the steps of the method may be performed and/or controlled by one or more processors outside the device, e.g., by one or more processors of an external controller, such as the controller 50.

At step 510, a device is placed on the object and a reference feature of the device is aligned with a reference feature of the object. The device may for example be attached by magnetic force, by a non-permanent adhesive, or by a suction effect.

The reference feature of the device may comprise a triangular shaped corner formed by a first outer edge and a second outer edge of the device, such as the above-mentioned corner 12. The corner may have an angle of 90 degree. The reference feature of the object may correspond to an outer corner of the object, such as the above-mentioned corner 40. Orientation alignment may then be achieved by aligning the two edges of the device with edges of the object, while position alignment may be achieved by aligning the tip of the corner with the outer corner of the object. Depending on the type of object for which the position and/or orientation is to be determined, also various other types of reference feature of the object and matching reference feature of the device may could be used. In some scenarios, the reference feature of the object and matching reference feature of the device may also include unique matching key structures.

As a result of step 510, the device is placed in a well-defined position and/or with a well-defined orientation on the object.

At step 520, signals are transmitted between the device placed on the object and a further device. The signals may be transmitted from the device to the further device. Alternatively or in addition, the signals may be transmitted from the further device to the device.

The device may thus act as a beacon transmitting signals enabling the measurement of the position of the at least one measurement point, such as the above-mentioned beacon 10. The at least one measurement point may then comprise a transmitter for sending the signals. If the signals include signals transmitted to the at least one measurement point, the at least one measurement point may comprise a receiver for receiving the signals.

At step 530, a position of the at least one measurement point is measured based on the signals transmitted at step 520. These measurements may for example involve run-time based distance measurements, signal-strength based distance measurements, trilateration calculations, and/or triangulation calculations.

Further, the position of the object is determined based on the measured position of the at least one measurement point and based on information on arrangement of the at least one measurement point in relation to the reference feature of the device. The information on arrangement of the at least one measurement point in relation to the reference feature of the device allows for considering how the measurement point is positioned in relation to the reference feature of the object may be preconfigured and for example be defined by a management data set associated with the device. If multiple different types of the device can be used, e.g., provided with different kinds of reference feature, the management data set may be associated with the device type. In some scenarios, the device could also transmit a signal indicating the management data set which is applicable for the device. For example, in the scenario the receiver unit 20 or the controller 50 could receive such signal and select an appropriate management data set for the beacon 10 depending on the received signal.

In some scenarios, like for example explained for the above-mentioned beacon 10, the device has multiple measurement points, and the positions of these multiple measurement points are measured based on signals transmitted between the multiple measurement points and the further device. In this case, the position of the object and an orientation of the object can be determined based on the measured positions of the measurement points and based on information on arrangement of the measurement points in relation to the reference feature of the device. For example, three measurement points on the device may be used to determine the position and orientation of the object in three-dimensions, e.g., in terms of three position coordinates and three rotation angles.

In addition or as an alternative to using multiple measurement points for determining the orientation, an orientation of the object may be determined based on measurements by an orientation sensor of the device and based on information on arrangement of the orientation sensor in relation to the reference feature of the device. The orientation sensor could for example be based on one or more accelerometers and/or gyroscopic sensors. If the measurements are not evaluated by the device itself, but rather by some other device, e.g., by the further device or by an external controller, such as the above-mentioned controller 50, the device may send one or more reports of the measurements by the orientation sensor to the other device.

Figure 6:
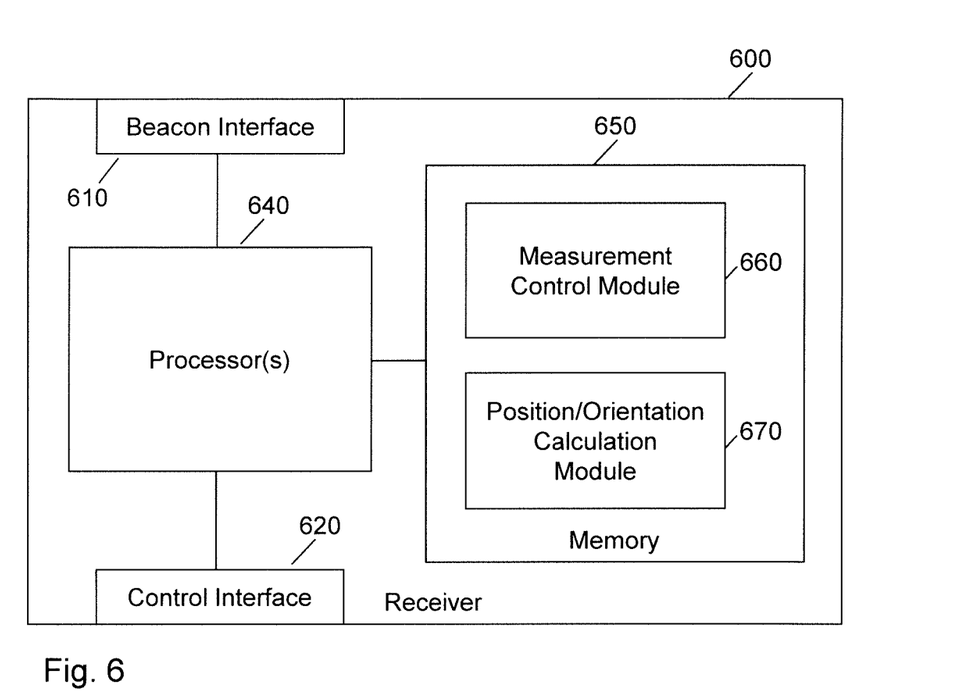
FIG. 6 schematically illustrates a processor-based implementation of a receiver according to an embodiment of the invention.

FIG. 6 shows a block diagram for schematically illustrating a processor based implementation of a receiver 600 which may be utilized for implementing the above concepts. The receiver may for example correspond to the above-mentioned receiver unit 20.

As illustrated, the receiver includes a beacon interface 610. The receiver 600 may utilize the beacon interface 610 for receiving signals from one or more beacons, such as the beacon 10. The beacon interface 610 may support reception of ultrasonic signals, radio signals, and/or of radar signals. In some scenarios, the beacon interface 610 may support directional reception of the signals, e.g., based on a multi-antenna technology or multi-receiver technology. Further, it is noted that in some scenarios the beacon interface 610 may also support bidirectional transmission. In this case, the beacon interface 610 could also be used for sending instructions or other control information to the beacon(s), such as the above-mentioned instructions to start or stop sending signals.

As further illustrated, the receiver 600 is provided with a control interface 620. The control interface 620 may be used for connecting the receiver to an external controller, such as the above-mentioned controller 50. Further, the control interface 620 may be used for connecting the receiver 600 to a robot, such as the above-mentioned robot 100. The control interface 620 can be a wireless interface, e.g., a radio interface, or a wire-based interface.

The control interface 620 may also be used for providing the receiver 600 with information concerning the arrangement of measurement points of a beacon in relation to a reference feature of the beacon and/or with information concerning the geometry of an object of which the position and orientation is to be determined.

Further, the receiver 600 is provided with one or more processors 640 and a memory 650. The beacon interface 610 and the memory 650 are coupled to the processor(s) 640, e.g., using one or more internal bus systems of the receiver 20.

The memory 650 includes program code modules 660, 670 with program code to be executed by the processor(s) 640. In the illustrated example, these program code modules include a measurement control module 660 and a position/orientation calculation module 670.

The measurement control module 660 may implement functionalities of controlling the above-mentioned functionalities of performing measurements on the basis of signals received from one or more measurement points of the beacon. The position/orientation calculation 670 may implement the above-described functionalities of calculating the position and orientation of the object on which the beacon is placed and aligned.

It is to be understood that the structures as illustrated in FIG. 6 are merely exemplary and that the receiver 600 may also include other elements which have not been illustrated, e.g., structures or program code modules for implementing known functionalities of an ultrasonic, radio, or radar receiver.

Figure 7:
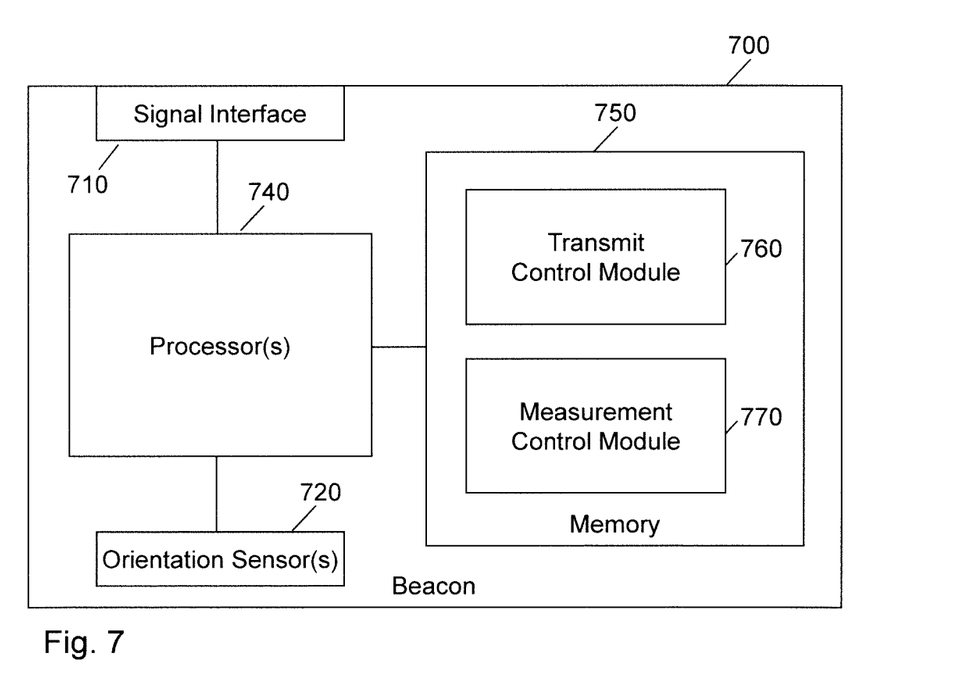
FIG. 7 schematically illustrates a processor-based implementation of a beacon according to an embodiment of the invention.

FIG. 7 shows a block diagram for schematically illustrating a processor based implementation of a beacon 700 which may be utilized for implementing the above concepts. The beacon 700 may for example correspond to the above-mentioned beacon 10.

As illustrated, the beacon 700 includes a signal interface 710. The beacon may utilize the signal interface 710 for sending signals to a receiver, such as the above-mentioned receiver unit 20. The signal interface 710 may support sending of ultrasonic signals, of radio signals, and/or of radar signals. Further, it is noted that in some scenarios the signal interface 710 may also support bidirectional transmission. In this case, the signal interface 710 could also be used for receiving instructions or other control information, such as the above-mentioned instructions to start or stop sending signals.

In some scenarios, the beacon may also include an orientation sensor 720. The orientation sensor may for example be based on an accelerometer and/or on a gyroscope.

Further, the beacon 700 is provided with one or more processors 740 and a memory 750. The signal interface 710 and the memory 750, and optionally the orientation sensor 720, are coupled to the processor(s) 740, e.g., using one or more internal bus systems of the beacon 700.

The memory 750 includes program code modules 760, 770 with program code to be executed by the processor(s) 740. In the illustrated example, these program code modules include a transmit control module 760 and a measurement control module 770.

The transmit control module 760 may implement the above described functionalities for sending the signals to the receiver mounted on the robot. The measurement control module 770 may implement functionalities for performing measurements locally at the beacon itself, e.g., using the orientation sensor 720.

It is to be understood that the structures as illustrated in FIG. 7 are merely exemplary and that the beacon 700 may also include other elements which have not been illustrated, e.g., structures or program code modules for implementing known functionalities of an ultrasonic and/or radio transmitter.

Further, it is noted that similar structures as shown in FIGS. 6 and 7 could also be used in a scenario where the measurements are based on signals received by the device which is placed on the object. In this case, the beacon interface 610 could be used for sending the signals, and the signal interface 710 could be used for receiving the signals. Further, the signal interface 710 could be used for reporting measurements on the signals to some other device. Moreover, the memory 650 could include a transmit control module for implementing the functionalities for transmitting the signals. Further, the memory 750 could include a reception control module to implement the functionalities for receiving the signals, and the measurement control module 770 could then may implement functionalities for performing measurements on the received signals.

As can be seen, the concepts according to embodiments as explained above allow for efficiently determining the position and/or orientation of an object using a single device placed on the object.

It is to be understood that the concepts as explained above are susceptible to various modifications. For example, the concepts could be applied in connection with various kinds of robotic systems and also in applications not related to robotics, such as tracking of an object or virtual reality applications. Further, the concepts may utilize various types of beacons and receivers.

The invention claimed is:

1. A method of determining a position of an object, the method comprising:
   placing a device on the object;
   aligning a reference feature of the object with a reference feature of the device, the device having a partial disc-shaped portion and the reference feature of the device comprising a triangular shaped corner formed by a first outer edge and a second outer edge of the device, the triangular shaped corner extending from the partial disc-shaped portion, wherein the corner has an angle of 90 degrees and the partial disc-shaped portion forms a three quarter-circular shape;
   based on signals transmitted between at least one measurement point of the device and a further device, measuring a position of the at least one measurement point; and
   determining the position of the object based on the measured position of the at least one measurement point and based on information on arrangement of the at least one measurement point in relation to the reference feature of the device.

2. The method according to claim 1, comprising:
   based on signals transmitted between multiple measurement points of the device and a further device, measuring positions of the multiple measurement points; and
   determining the position of the object and an orientation of the object based on the measured positions of the measurement points and based on information on arrangement of the measurement points in relation to the reference feature of the device.

3. The method according to claim 1, comprising:
   determining an orientation of the object based on measurements by an orientation sensor of the device and based on information on arrangement of the orientation sensor in relation to the reference feature of the device.

4. The method according to claim 1,
   wherein the reference feature of the object comprises an outer corner of the object.

5. The method according to claim 1,
   wherein the signals comprise signals emitted from the at least one measurement point.

6. The method according to claim 1,
   wherein the signals comprise signals transmitted to the at least one measurement point.

7. The method according to claim 1,
   wherein the signals comprise at least one of ultrasonic signals, radio signals, and radar signals.

8. A system, comprising:
   a device to be placed on an object, the device comprising a reference feature configured to be aligned with a reference feature of the object and at least one measurement point, the device having a partial disc-shaped portion and the reference feature of the device comprising a triangular shaped corner formed by a first outer edge and a second outer edge of the device, the triangular shaped corner extending from the partial disc-shaped portion, wherein the corner has an angle of 90 degrees and the partial disc-shaped portion forms a three quarter-circular shape;
   a further device configured to receive signals sent from the at least one measurement point of the device and/or to send signals to the at least one measurement point of the device; and
   at least one processor configured to:
      based on the signals transmitted between the at least one measurement point and the further device, measure a position of the at least one measurement point; and
      determine a position of the object based on the measured position of the at least one measurement point and based on information on arrangement of the at least one measurement point in relation to the reference feature of the device.

9. The system according to claim 8,
   wherein the at least one processor is part of the further device.

10. The system according to claim 8,
    wherein the at least one processor is part of the device.

11. The system according to claim 8,
    wherein the device comprises multiple measurement points, and wherein the at least one processor is configured to:
    measure positions of the multiple measurement points based on signals transmitted between the multiple measurement points and the further device; and
    determine the position of the object and an orientation of the object based on the measured positions of the measurement points and based on information on arrangement of the measurement points in relation to the reference feature of the device.

12. The system according to claim 8,
    wherein the device comprises an orientation sensor; and
    wherein the at least one processor is configured to:
    determine an orientation of the object based on measurements by the orientation sensor and based on information on arrangement of the orientation sensor in relation to the reference feature of the device.

13. The system according to claim 12,
    wherein the corner has an angle of 90 degree.

14. The system according to claim 8,
    wherein the reference feature of the object comprises an outer corner of the object.

15. The system according to claim 8,
    wherein the signals comprise at least one of ultrasonic signals, radio signals, and radar signals.

16. A device, comprising:
    a reference feature configured to be aligned with a reference feature of an object on which the device is placed, the device having a partial disc-shaped portion and the reference feature of the device comprising a triangular shaped corner formed by a first outer edge and a second outer edge of the device, the triangular shaped corner extending from the partial disc-shaped portion, wherein the corner has an angle of 90 degrees and the partial disc-shaped portion forms a three quarter-circular shape; and
    at least one measurement point having a known arrangement in relation to the at least one reference feature of the device and configured to send signals to a further device and/or to receive signals from a further device,
    wherein the signals are configured to enable measurement of a position of the at least one measurement point.

17. The device according to claim 16,
    wherein the device comprises multiple measurement points, each having a known arrangement in relation to the at least one reference feature of the device and configured to send signals to a further device and/or to receive signals from a further device.

18. The device according to claim 16,
wherein the device comprises an orientation sensor having a known arrangement in relation to the at least one reference feature of the device.

19. The device according to claim 16,
wherein the corner has an angle of 90 degree.

20. The device according to claim 16,
wherein the reference feature of the object comprises an outer corner of the object.

21. The device according to claim 16,
wherein the signals comprise at least one of ultrasonic signals, radio signals, and radar signals.

22. The device according to claim 16, wherein the device comprises at least one processor configured to:
measure positions of the multiple measurement points based on signals transmitted between the multiple measurement points and the further device.

23. The device according to claim 22,
wherein the at least one processor is further configured to:
determine the position of the object and an orientation of the object based on the measured positions of the measurement points and based on information on arrangement of the measurement points in relation to the reference feature of the device.

* * * * *